United States Patent
Blaszczak et al.

(10) Patent No.: US 9,584,891 B1
(45) Date of Patent: Feb. 28, 2017

(54) RECONFIGURABLE AUDIO DRIVERS

(71) Applicant: AMAZON TECHNOLOGIES, INC., Reno, NV (US)

(72) Inventors: Piotr Pawel Blaszczak, Sunnyvale, CA (US); Kevin Rea Hoskins, Hollister, CA (US); Matthew Kramer, Los Gatos, CA (US); Reuben Eric Martinez, Pueblo West, CO (US); Peter John Thomas Johnson, Seattle, WA (US); John Wollersheim, Redmond, WA (US); David Charles Buuck, Prunedale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 158 days.

(21) Appl. No.: 14/139,318

(22) Filed: Dec. 23, 2013

(51) Int. Cl.
*H04R 1/02* (2006.01)
*H04R 7/06* (2006.01)

(52) U.S. Cl.
CPC .............. *H04R 1/028* (2013.01); *H04R 7/06* (2013.01); *H04R 2440/01* (2013.01); *H04R 2440/05* (2013.01)

(58) Field of Classification Search
CPC .......... H04R 1/02; H04R 1/025; H04R 1/026; H04R 1/028; H04R 5/02; H04R 7/04; H04R 7/045; H04R 17/00; H04R 17/005; H04R 19/00; H04R 19/005; H04R 19/01; H04R 19/013; H04R 2201/02; H04R 2201/021; H04R 2201/025; H04R 2420/07; H04R 2499/11; H04R 2499/15; H04R 1/021; H04R 1/28; H04R 7/06; H04R 2440/00; H04R 2440/01; H04R 2440/03; H04R 2440/05; H04R 2440/07; G06F 1/1688

See application file for complete search history.

(56) References Cited

U.S. PATENT DOCUMENTS

| 6,332,029 | B1 * | 12/2001 | Azima ................. B42D 15/022 181/166 |
| 9,049,911 | B1 | 6/2015 | Wood et al. |
| 2003/0007653 | A1 * | 1/2003 | Azima ..................... H04R 1/24 381/152 |
| 2006/0079277 | A1 | 4/2006 | Ditzik |
| 2007/0239921 | A1 | 10/2007 | Toorians et al. |
| 2008/0298608 | A1 * | 12/2008 | Wilcox .......................... 381/120 |
| 2008/0304680 | A1 * | 12/2008 | Wilcox .......................... 381/152 |
| 2009/0074200 | A1 * | 3/2009 | Kim et al. ...................... 381/86 |

(Continued)

OTHER PUBLICATIONS

King, Simon, "Non Final Office Action dated Aug. 18, 2015", U.S. Appl. No. 14/139,276, The United States Patent and Trademark Office, Aug. 18, 2015.

(Continued)

*Primary Examiner* — Mark Fischer
(74) *Attorney, Agent, or Firm* — Lindauer Law PLLC

(57) ABSTRACT

An audio accessory comprising one or more speaker units may be used to provide audio output for a media device such as a tablet computer, smartphone, and so forth. The speaker units may be affixed to various surfaces, such as an acoustic panel which serves as a portion of a cover for the media device. The acoustic panel may act as an acoustic radiator which is driven by one or more of the speaker units. When not in use, a pair of the speaker units may be joined together for compact storage.

20 Claims, 12 Drawing Sheets

(56) References Cited

U.S. PATENT DOCUMENTS

| | | |
|---|---|---|
| 2011/0163642 A1 | 7/2011 | Rohrbach et al. |
| 2012/0054493 A1* | 3/2012 | Bradley .................... 713/171 |
| 2012/0250928 A1* | 10/2012 | Pance et al. ................ 381/386 |
| 2012/0308064 A1 | 12/2012 | Matthews et al. |
| 2013/0043148 A1* | 2/2013 | Chen et al. ................ 206/45.23 |
| 2014/0151248 A1 | 6/2014 | Hurst et al. |

OTHER PUBLICATIONS

King, Simon, "Notice of Allowance dated Jan. 29, 2016", U.S. Appl. No. 14/139,276, The United States Patent and Trademark Office, Jan. 29, 2016.

* cited by examiner

RECONFIGURABLE AUDIO DRIVERS

BACKGROUND

Audio output from media devices is part of presentation of a wide variety of content including audiobooks, music, television, movies, games, and so forth. The media devices may include smart phones, tablet computers, portable media devices, laptop computers, desktop computers, in-vehicle entertainment systems, and so forth.

Figure 1:
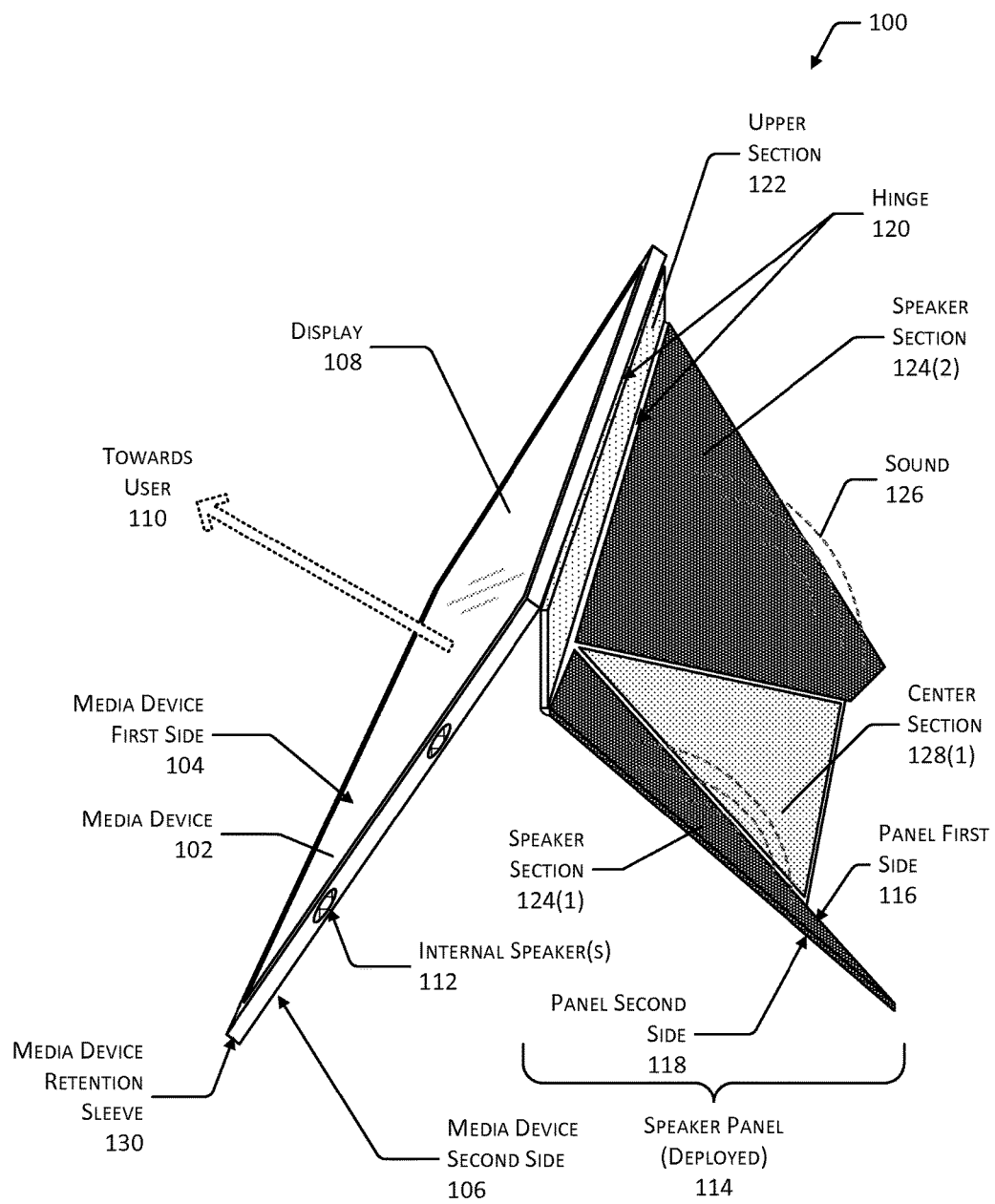
FIG. 1 is a view of a first audio accessory for a media device having a plurality of speaker sections containing speakers and configured to act as a cover and a stand.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout. The figures provided are not necessarily to scale, and the elements therein may not be proportionate to one another. For example, the size of some elements depicted may be enlarged or exaggerated for clarity of illustration.

DETAILED DESCRIPTION

Media devices such as smart phones, tablet computers, portable media devices, laptop computers, desktop computers, in-vehicle entertainment systems, and so forth may be configured to provide audio output. The audio output may include audio associated with content, such as music, dialogue, and so forth. The audio output may also include system generated sounds, such as audible prompts generated by an application.

As content consumption continues to expand to ever more portable form factors, such as handheld tablets, smart phones, and so forth, users may desire and improved audio experience. For example, while watching a theatrical release the user may wish to experience multi-channel sound, such as Dolby Surround 7.1 as developed by Dolby Laboratories, Inc. of San Francisco, Calif. Traditionally, the onboard audio systems of these media devices are subject to various constraints which impact the audio output from these onboard audio systems. For example, a sub-woofer may be unavailable on the media device to generate low-frequency sounds present in the theatrical release.

Described in this application are audio accessories configured to be used with a media device. These audio accessories may enhance the user experience of the media device by providing one or more of additional speakers to provide additional channels of audio output, additional amplification to increase the overall sound level, or may improve spatialization by allowing speakers to be physically separated or displaced during use. In some implementations, use of the audio accessories may reduce power consumption of the media device by using a power supply of the accessory to drive the speakers of the audio accessories, reducing the draw on a battery of the media device.

A first accessory described in this application comprises a speaker panel. The speaker panel may be coupled to the media device using a coupling assembly. The coupling assembly may include latches, straps, suction cups, sleeves, pockets, or other devices configured to physically attach the speaker panel to the media device. The coupling assembly may be configured to allow the speaker panel to move relative to the media device. By changing the relative position between the speaker panel and the media device, the speaker panel may be used as a case or cover for at least a portion of the media device. For example, the speaker panel may be moved and used to cover a front of the media device.

The speaker panel may include one or more sections. These sections may include speaker sections within which one or more speakers are mounted. Other sections may provide mechanical support to the speaker sections, the media device, or both.

The sections may be arranged in various configurations. In one implementation the speaker panel may comprise a single section. In another implementation the speaker panel may include several sections. For example, the speaker panel may have five sections which include two speaker sections, two center sections, and an upper section which is attached to the media device. These five sections may be hinged together such that they may be folded or otherwise displaced relative to one another in such a fashion as to provide a stand able to support the media device.

In one implementation, one or more of the speaker sections may be detachable from the speaker panel. For example, a detachable speaker section which includes one or more speakers may be separated from the speaker panel and moved to a position convenient to the user. In some implementations, the detachable speaker may be configured to remain connected to the media device via a wired or wireless connection.

A second accessory described in this application comprises one or more speaker units which may be used in conjunction with the acoustic panel. The speaker units may be configured to drive the acoustic panel such that the acoustic panel acts as an acoustic radiator. For example, a speaker unit may include an exciter which is configured to introduce vibrations into the acoustic panel which then cause the acoustic panel to emit sound. That is, the acoustic panel vibrates based on the input from the speaker unit, and the vibration in turn generates sound waves by moving the acoustic panel and displacing air molecules. The acoustic panel may be considered passive in that it is unable to produce sound without a speaker or exciter. In some implementations the acoustic panel may include one or more electronic components for electrical conductors.

The speaker units are configured to be attached or detachable to the acoustic panel. Different speaker units may be configured to provide different types of audio output. For example, one speaker unit may be a bass unit configured to provide low-frequency sounds while another speaker unit may be a tweeter configured to provide high-frequency sounds. Thus, the user may be able to mix and match speaker units to suit their particular use case or tastes.

In some implementations, the acoustic panel may be configured such that speaker units may only be mounted at certain predetermined locations. The acoustic panel may be configured with attachment points which are complementary to an attachment mechanism of the speaker units and which constrain placement to these predetermined locations. The attachment points may correspond to the predetermined locations which are configured to provide a particular acoustic response when driven by the speaker unit. The particular acoustic response may include resonance, non-resonance, and so forth. For example, a particular location on the acoustic panel may be determined to be well-suited to accept exciter input for low frequencies, while another location may be better suited for high frequencies.

In other implementations, the user may place the speaker units at any location on the acoustic panel. For example, the acoustic panel may comprise a ferrous material such as steel, and the attachment mechanism of the speaker units may comprise a magnet. The user may then magnetically stick the speaker unit at whatever location on the acoustic panel is desired.

The speaker units may also be configured to operate independently of the acoustic panel, or may operate in conjunction with media devices which do not have an acoustic panel. In one implementation, the speaker units may include speaker circuitry such as a power supply, communication interface, audio amplifier, and so forth. The speaker units may also include a diaphragm or other mechanism configured to generate sound waves when not coupled to the acoustic panel. When detached, the speaker units may be placed on other surfaces in the environment during use. For example, the user may set a speaker unit to the side of the media device during use.

For ease of storage, transport or for other reasons, the speaker units may be configured to couple to one another. For example, a pair of speaker units may be attached to one another.

A third accessory described in this application comprises a grip body which may be attached or detached from the media device. The grip body includes one or more speakers, and may act as a handhold with which the user may more easily grasp the media device. In some implementations, the grip body may attach to the media device using a clamp mechanism or other friction fit. In some implementations, the grip body may include speaker circuitry such as a power supply, communication interface, audio amplifier, and so forth.

In some implementations, the onboard speakers of the media device may be used in conjunction with the speakers of the accessory. For example, the onboard speakers and the accessory speakers may be driven such that the sound produced is that which is optimized for the individual speaker.

Illustrative Devices

FIG. 1 is a view 100 of a first audio accessory. The audio accessory is configured to be used in conjunction with a media device 102. The media device 102 may include a smart phone, tablet computer, portable media device, laptop computer, desktop computer, in-vehicle entertainment system, and so forth. For ease of illustration, and not necessarily as a limitation, the media devices 102 are depicted in this disclosure as a having a generally rectilinear parallelepiped, or slab, shape. However, in other implementations the media devices 102 may have other shapes or form factors such as having a curved back, may be arcuate in a plan view, and so forth.

The media device 102 may have a first side 104 and a second side 106, corresponding to a front and a back of the media device 102, respectively. The first side 104 and a second side 106 are on opposite sides of the media device 102. The first side 104 may be the side which includes a display 108 which is configurable to present information to a user. During consumption of content which includes graphical elements, such as while viewing video, the media device 102 may be generally directed towards the user as indicated by arrow 110. For example, the user may typically be positioned in front of the media device 102 to allow for viewing of the display 108. The media device 102 may include one or more internal speakers 112. These internal speakers 112 are configured to provide audio output to the user. The audio output may include sounds generated by an operating system of the media device 102, applications executing on the media device 102, and so forth. For example, the audio output may include sound from a theatrical release being presented to the user.

The media device 102 may be coupled to a speaker panel 114. The speaker panel 114 is configured to provide audio output based on audio signals or audio data provided by the media device 102. The speaker panel 114 may also be configured to act as a cover for at least a portion of the media device 102, to act as a stand for the media device 102, and so forth.

In this illustration, the speaker panel 114 is illustrated in a deployed configuration, in which the speaker panel 114 serves to act as a stand for the media device 102. The speaker panel 114 has a panel first side 116 and a panel second side 118 which is opposite the panel first side 116.

A coupling assembly is configured to attach the speaker panel 114 to the media device 102. The coupling assembly may include latches, straps, suction cups, sleeves, pockets, or other devices configured to physically attach the speaker panel 114 to the media device 102. In one implementation, the coupling assembly may comprise one or more latches configured to mechanically engage one or more features on the media device 102. The coupling assembly may be configured to allow the speaker panel 114 to move relative to the media device 102.

Terms including, but not limited to, "join", "attach", "affix", "couple", "fastened", and so forth, may indicate a mechanical or physical linking or connection between two or more objects. This connection may be permanent in that the two objects remain connected, or may be temporary such that the two objects may be separated from one another.

In this illustration, the coupling assembly includes a hinge 120. The hinges 120 are configured to allow the speaker panel 114 to be moved from a position which is adjacent to the second side of the media device 106 as illustrated in this figure, or adjacent to the first side of the media device 104. As used in this disclosure, "adjacent" may indicate two objects or structures which are in contact, which are not in contact but proximate to one another, which abut one another, and so forth. As shown here, when adjacent to the second side of the media device 106, the speaker panel 114 may serve as a stand for the media device 102. When adjacent to the first side of the media device 104, the speaker panel 114 may serve as a cover for the display 108. The illustrations in this disclosure depict the speaker panel 114 or similar elements as being attached to the media device 102 along a longest edge of the media device 102. For example, a media device 102 which measures 10 cm wide by 20 cm long by 0.5 cm thick would have a longest edge of 20 cm. In other implementations, the speaker panel 114 or similar element may be attached to the media device 102 along a second longest edge of the media device 102. Described another way, the cover may fold over the media device 102 in a portrait or landscape fashion.

In the implementation depicted here, the speaker panel 114 comprises five sections which are attached by hinges 120, which may fold at the hinges 120. The hinges 120 may comprise living hinges, piano hinges, barrel hinges, strap hinges, flexible material, and so forth. An upper section 122 of the speaker panel 114 is coupled to the media device 102 by way of one or more hinges 120.

The speaker panel 114 includes one or more speaker sections 124. The speaker section 124 may include one or more speakers configured to generate sound 126. In some implementations the speaker section 124 may comprise a flexible material. For example, the speaker section 124 may support the one or more speakers by way of a woven fabric, flexible plastic, foam, metal mesh, and so forth. The speaker panel 114 may also have one or more center sections 128. The center sections 128 may provide structural support to the one or more speaker sections 124, or other portions of the speaker panel 114. The sections of the speaker panel 114 may be joined by one or more hinges 120. An illustration of one implementation of the configuration of the sections is depicted below in more detail with regard to FIG. 3.

During audio presentation, sound 126 may be emitted by the speakers in the speaker panel 114, by the internal speakers 112 of the media device 102, or by a combination thereof. For example, different speakers may be assigned to provide output associated with different audio channels, such as left, right, center, and so forth.

In some implementations, the speaker panel 114 may be attached to the media device 102 by way of a media device retention sleeve 130. The media device retention sleeve 130 may include one or more features configured to mechanically retain or otherwise engage the media device 102. For example, the media device retention sleeve 130 may comprise an elastic or elastomeric material configured to retain the media device 102 by compression. The media device retention sleeve 130 may be configured as a pocket, one or more straps, and so forth. In some implementations, the accessory may comprise a front panel which is joined by the hinge 120 to the upper section 122. The front panel may include or be coupled to the media device retention sleeve 130.

The speaker panel 114 may be configured in some implementations to couple to, or be a portion of, a container for use with the media device 102. For example, the media device 102 may include a wearable computer such as a watch or a pair of eyeglasses. The speaker panel 114 may be a portion of a case for the eyeglasses.

Figure 2:
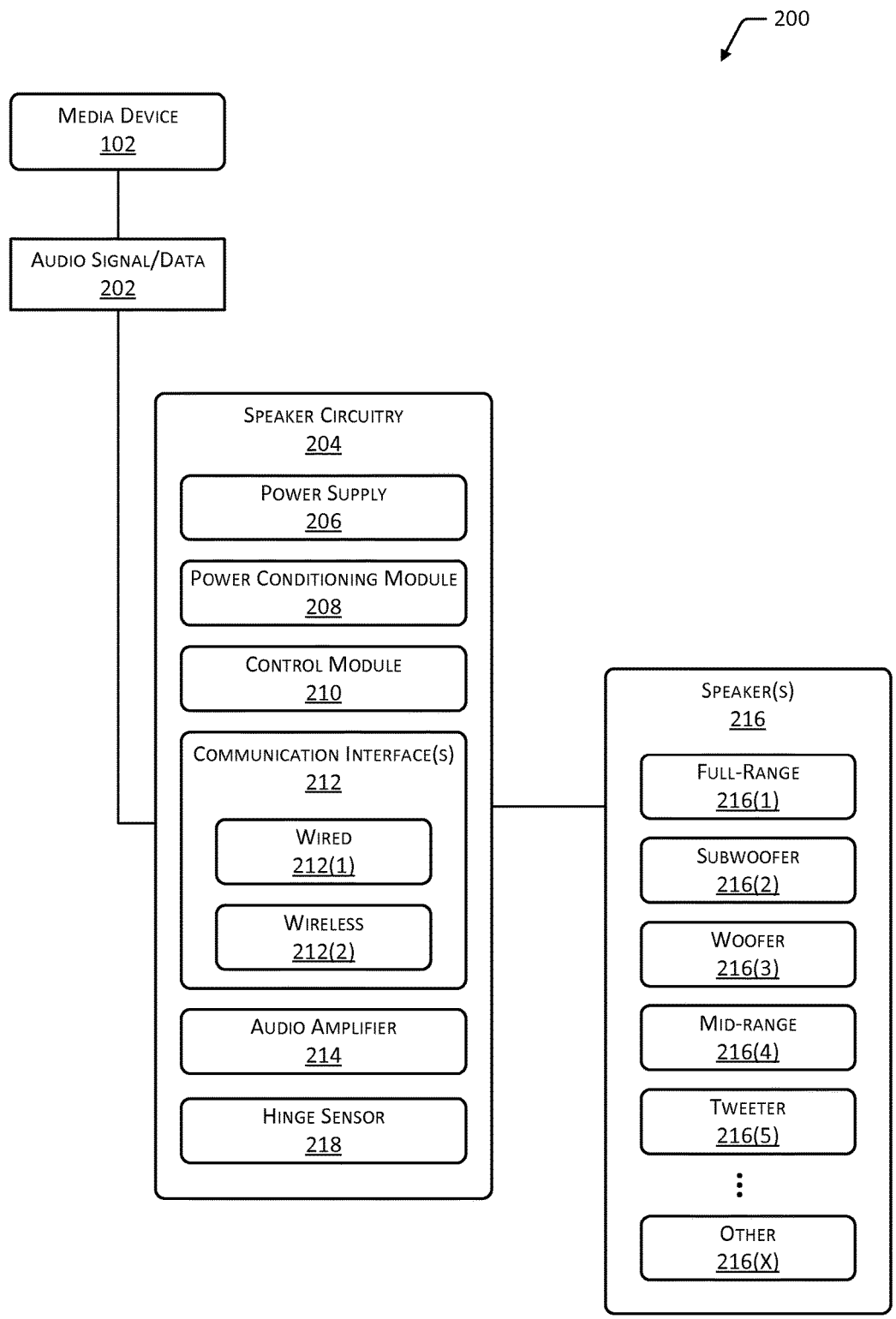
FIG. 2 is a block diagram of speaker circuitry for use with one or more speakers.

FIG. 2 is a block diagram 200 of speaker circuitry for use with one or more speakers. As described above the media device 102 may be configured to emit audio output. The audio output may be emitted by the internal speakers 112, wireless interfaces, wired interfaces, and so forth. The accessories described in this disclosure may be configured with speaker circuitry configured to accept this audio output and emit sound.

The media device 102 may provide an audio signal/data 202 to speaker circuitry 204. The audio signal/data 202 may include an analog audio signal or a digital representation of an analog signal. The audio signal/data 202 may be transmitted wired or wirelessly. In one implementation, the media device 102 may couple to the speaker circuitry 204 by way of electrical conductors configured to convey an analog audio signal. In another implementation, the logical conductors may be configured to convey digital audio signals. In yet another implementation, the media device 102 may couple to speaker circuitry 204 by way of a wireless communication interface, such as Bluetooth®, Wi-Fi™, ZigBee®, and so forth.

The speaker circuitry 204 may include a power supply 206. The power supply 206 is configured to provide electrical power suitable to operate the components of the speaker circuitry 204 to generate sound. The power supply 206 may include one or more batteries, fuel cells, photovoltaic cells, wireless power receivers, and so forth. The speaker circuitry 204 may also include a power conditioning module 208 configured to provide electrical power at a particular voltage, frequency, and so forth. For example, the power conditioning module 208 may include a voltage booster.

A control module 210 may also be part of the speaker circuitry 204. The control module 210 may comprise one or more of analog or digital components. In one implementation, the control module 210 may comprise a microprocessor.

One or more communication interfaces 212 may be provided. The interfaces 212 may comprise inter-integrated circuit ("I2C"), serial peripheral interface bus ("SPI"), Universal Serial Bus ("USB") as promulgated by the USB Implementers Forum, RS-232, High Definition Multimedia Interface ("HDMI") as promulgated by HDMI Licensing LLC, TOSLINK as promulgated by Toshiba Corp., analog video, analog audio, IEEE 1394 as promulgated by the Institute for Electrical and Electronics Engineers, Ethernet, Wi-Fi™, Bluetooth®, ZigBee®, and so forth. The communications interfaces 212 may thus include interfaces which are wired 212(1), wireless 212(2), or both. For example, the wireless communication interface 212(2) may use a radio frequency signal to send the audio signal/data 202.

One or more audio amplifiers 214 may be configured to amplify the audio signal/data 202 and drive one or more speakers 216. For example, the audio amplifier 214 may include one or more transistors. In some implementations, the audio amplifier 214 may include or be coupled to a digital-to-analog converter (DAC). For example, the audio signal/data 202 may be received by way of a Bluetooth® wireless communication interface 212(2) in digital format. The DAC may convert the digital audio signal to an analog signal. In some implementations, a signal which is digitally encoded may be amplified and used to directly drive one or more speakers 216.

The accessories may use one or more speakers 216. The speakers 216 may be configured to emit sounds in various frequency ranges. The speakers 216 may include full-range 216(1), subwoofers 216(2), woofers 216(3), mid-range 316 (4), tweeters 216(5), or other speakers 216(X).

The speakers 216 may include exciters which are configured to move a diaphragm, panel, or other surface to displace air and create the vibrations which make up sound. The exciters may use one or more of a voice coil, a piezoelectric device, or an electrostatic driver. For example, the exciters may displace a cone, diaphragm, or a panel to produce sound.

The speakers 216 may include bending wave transducers in which the diaphragm is configured to flex during operation. Other speaker types 216(X) such as distributed mode loudspeakers, air motion transducers, flat-panel loudspeakers, plasma arc speakers, transparent ionic conduction speakers, thermoacoustic speakers, and so forth may be used.

In some implementations, the speaker circuitry 204 may include one or more hinge sensors 218. The hinge sensors 218 are configured to provide an indication of a state or position of a hinge 120. In one implementation, the hinge sensors 218 may comprise strain gauges. The control module 210 may be configured to adjust output of the audio amplifier 214 based at least in part on the state of the hinges 120. For example, a hinge sensor 218 may be mounted in the hinge 120 which couples the speaker panel 114 to the media device 102. The control module 210 may be configured to apply a first signal processing effect (such as selectively increasing amplification at one or more frequencies, decreasing amplification at one or more frequencies, and so forth) when the hinge sensor 218 indicates the speaker panel 114 is stowed. The first signal processing effect may be configured to provide the sound 126 which is adjusted to account for the impact of the stowed configuration on the acoustics of the system. Likewise, the control module 210 may be configured to apply a second signal processing effect when the hinge sensor 218 indicates the speaker panel 114 is deployed. In this way, the control module 210 enables the speaker panel 114 to take into account changes in the acoustic environment and adjust the output accordingly to maintain sound 126 having particular characteristics.

In some implementations instead of, or in addition to, the hinge sensor 218 other sensors may be employed to determine the configuration of the speaker panel 114, the media device 102, or both. For example, a sensor on the speaker panel 114 may be configured to determine proximity of an object such as the media device 102. The sensors may be part of the media device 102. For example, a Hall-effect sensor on the media device 102 may be configured to detect a magnet in the speaker panel 114. The control module 210 may be configured to receive information from the sensors on the media device 102 by way of the communication interface 212.

In some implementations, speaker circuitry 204 may include one or more other components including filters, digital signal processors, user input devices such as buttons to control volume, and so forth.

The speaker circuitry 204 may be incorporated, encapsulated, or otherwise associated with the speaker panel 114. For example, the speaker circuitry 204 may be implemented as flex circuits and surface mount devices which may be placed within a covering of the speaker panel 114.

In some implementations, the speaker circuitry 204 may be configured to drive the speakers 216 and generate sound contemporaneously with sound emitted by one or more internal speakers 112 of the media device 104. For example, the media device 102 may send audio associated with a bass channel to a woofer 216(3) in the speaker section 124, while audio associated with a mid-range channel is sent to the internal speakers 112.

Figure 3:
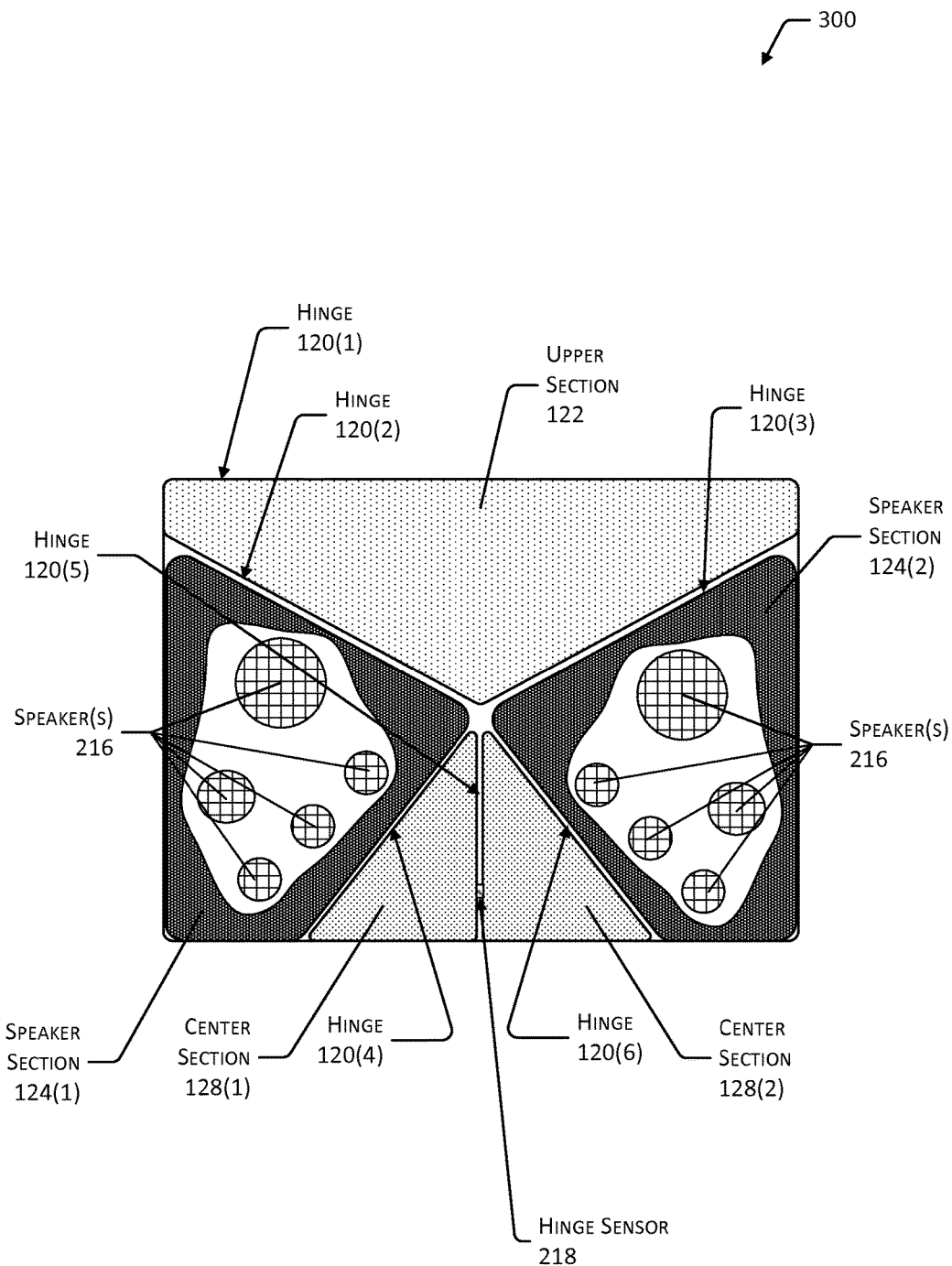
FIG. 3 is a rear view of the first audio accessory depicting a plurality of sections and hinges in a stowed configuration.

FIG. 3 is a rear view 300 of the first audio accessory depicting a plurality of sections and hinges in a stowed configuration. In this view, the first audio accessory is depicted in a flat configuration, such as when stowed or not deployed as a stand.

As described above, the speaker panel 114 may include one or more speaker sections 124. Each speaker section 124 may include one or more speakers 216. For example, a cutaway view depicts several speakers 216 within the speaker section 124(2). In some implementations, these may include different types of speakers, such as a woofer 216(3), a mid-range 216(4), and a tweeter 216(5). In another implementation, the speaker section 124 may include a plurality of the same type of speaker 216. For example, a linear array of identical speakers 216 may be provided.

The speaker sections 124 may be configured to emit the sound 126 from the speakers 216 from the panel first side 116, the panel second side 118, or both. For example, perforations or holes may be provided in a casing of the speaker section 124 such that sound 126 is emitted from the panel first side 116. In another example, the speaker sections 124 may be configured to emit sound 126 by vibrating or otherwise moving at least a portion of the surface of the speaker section 124, such when employing a flat panel speaker.

As described above, the sections of the speaker panel 114 may be joined to one another by way of one or more hinges 120. In some implementations, one or more hinge sensors 218 may be present in the speaker panel 114. As described above, in some implementations the speaker panel 114 may include at least one hinge sensor 218 configured to determine a state of one or more of the hinges 120. The control module 210 may be configured to control operation of speaker panel 114 based at least in part on state. For example, the control module 210 may be configured to change operation of the audio amplifier 214 based at least in part on the determined state of the one or more hinges 120, such as increasing audio amplifier 214 output when the speaker panel 114 is deployed.

In the implementation depicted here, the speaker panel 114 includes five sections. In some implementations, some of these sections may be rigid or flexible. As used in this disclosure, a section may be considered rigid which has a relatively high modulus of elasticity and is thus resistant to deformation. For example, the section may comprise one or more of a metal, ceramic, plastic, composite material, and so forth having sufficient thickness or overall structure configured to provide a desired level of rigidity. In comparison, a flexible section may comprise a woven fabric, flexible plastic, metal mesh, other material or material configuration which may be readily folded, rolled, and so forth.

The upper section 122 is configured to couple to the media device 102 as described above by way of a first hinge 120(1). In one implementation the upper section 122 may couple to the media device retention sleeve 130 by way of the first hinge 120(1), and the media device retention sleeve 130 may in turn retain the media device 102. In some implementations, the upper section 122 may include one or more speakers 216.

The speaker panel 114 may also include a first speaker section 124(1) and a second speaker section 124(2). In some implementations, the speaker panel 114 may include more or fewer speaker sections 124. Each speaker section 124 may comprise one or more speakers 216 configured to generate sound. The first speaker section 124(1) is coupled to the upper section 122 by way of a second hinge 120(2) and the second speaker section 124(2) is coupled to the upper section 122 by way of a third hinge 120(3).

In one implementation, the speaker section 124 may comprise a flexible material configured to support the one or more speakers 216. Continuing the example, the speaker section 124 may comprise a fabric to which one or more speakers 216 are glued, sewn, or otherwise joined to. In this implementation, the hinge 120 may comprise a portion of the flexible material. For example, the flexible material of the speaker section 124 may be joined to the adjacent section.

A first center section 128(1) is coupled to the first speaker section 124(1) by way of a fourth hinge 120(4) and also coupled to a second center section 128(2) by way of a fifth hinge 120(5). The second center section 128(2) is coupled to the second speaker section 124(2) by way of a sixth hinge 120(6). In some implementations, one or both of the center sections 128 may include one or more speakers 216.

The sections of the speaker panel 114 are configured to maintain at least two positions, a stowed position or a deployed position. In the stowed position, the speaker panel 114 covers the media device first side 104 or the media device second side 106 of the media device 102. In the deployed position, the speaker panel 114 extends at least partly away from the media device 102 or the media device retention sleeve 130 which is holding the media device 102 to form a stand from one or more rigid sections. The stand is configured to prevent the media device 102 from resting flat on a supporting surface. For example, the stand may be configured to hold the media device 102 at an angle which is convenient for use by the user.

The first speaker section 124(1) and the second speaker section 124(2) may be positioned such that a side of the speakers 216 configured to emit sound 126 during operation is adjacent to the media device first side 104 (or front) of the media device 102 when in the stowed position. In this position, the speaker panel 114 may act as a cover for the display 108.

Figure 4:
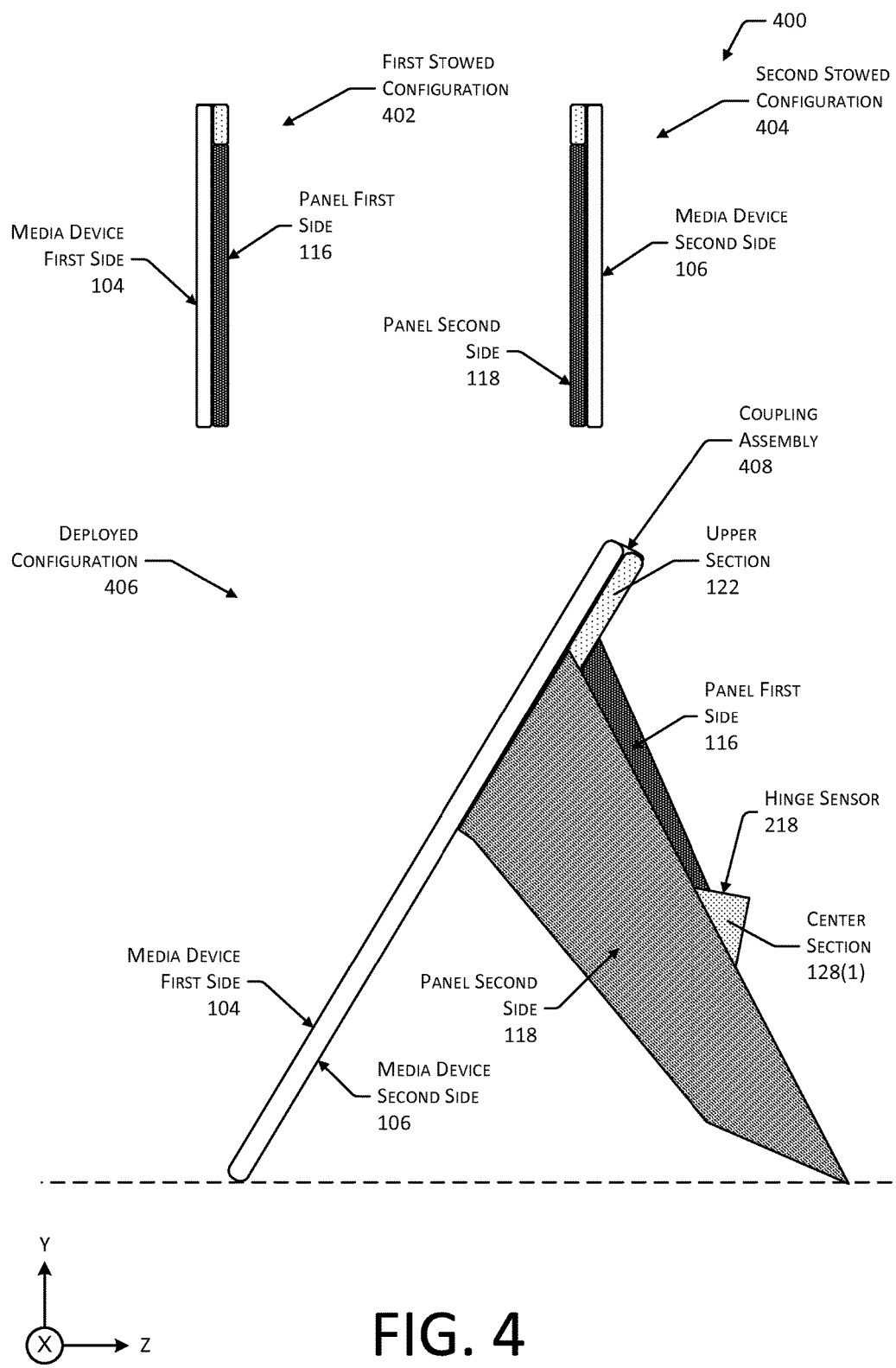
FIG. 4 is a side view of the first audio accessory.

FIG. 4 is a side view 400 of the first audio accessory. In this illustration, a first stowed configuration 402, a second stowed configuration 404, and a deployed configuration 406 are depicted. The first stowed configuration 402 depicts the speaker panel 114 stowed against the media device second side 106 (or back) of the media device 102. For example, the first stowed configuration 402 may be used when the user is holding the media device 102 with the attached accessory in a hand.

In comparison, the second stowed configuration 404 depicts the speaker panel 114 stowed against the media device first side 104 (or front) of the media device 102. In this configuration, the speaker panel 114 may act as a cover for the display 108.

As described above a coupling assembly 408 is configured to attach the speaker panel 114 and the media device 102. As depicted here, in some implementations the coupling assembly 408 may be configured to attach the speaker panel 114 to the media device 102 at a longest edge. The coupling assembly 408 may include latches, straps, sleeves, pockets, adhesives, or other devices configured to physically attach the speaker panel 114 to the media device 102. In one implementation, the coupling assembly 408 may comprise one or more latches configured to mechanically engage one or more features on the media device 102. The coupling assembly 408 may be configured to allow the speaker panel 114 to move relative to the media device 102, such as shown here to maintain the first stowed configuration 402, the second stowed configuration 404, the deployed configuration 406, or a combination thereof.

In this side view, while in the deployed configuration 406 the panel second side 118 of the speaker section 124 may be generally directed towards the user 110. In some implementations, the speaker section 124 may be configured to emit the sound 126 from the speakers 216 from at least the panel second side 118.

Figure 5:
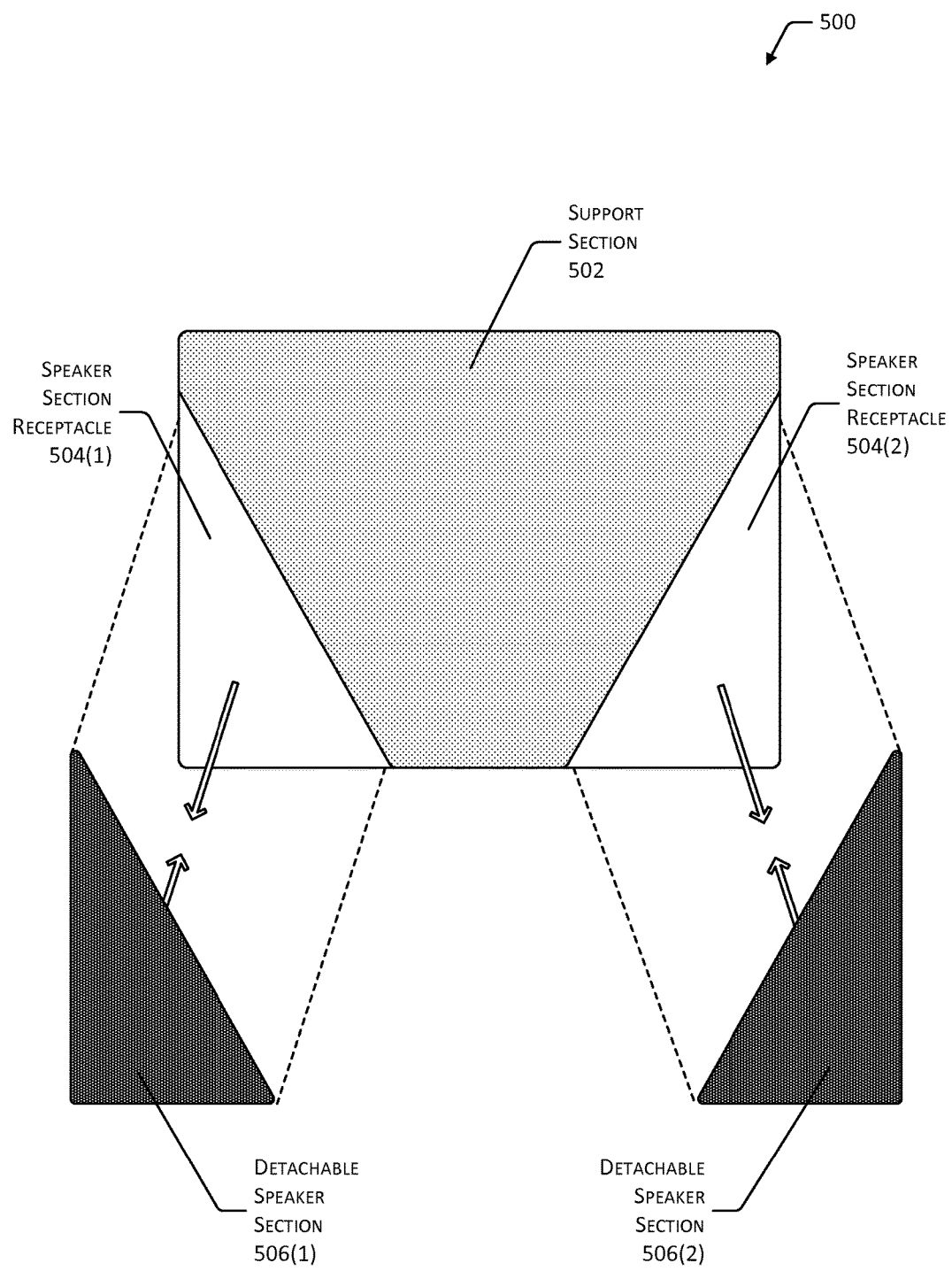
FIG. 5 is a rear view of a second implementation of the first audio accessory, in which the speaker sections are detachable.

FIG. 5 is a rear view 500 of a second implementation of the first audio accessory. In this implementation, one or more of the speaker sections 124 are detachable from the speaker panel 114.

In this illustration, a support section 502 is depicted. The support section 502 may be used in place of the speaker panel 114 described above, and may be similarly mounted to the media device 102. The support section 502 may include one or more speaker section receptacles 504. The speaker section receptacles 504 may include one or more attachment points. These attachment points may provide one or more of electrical, optical, or mechanical connections between the support section 502 and a detachable speaker section 506.

The detachable speaker section 506 may include at least a portion of the speaker circuitry 204 described above, one or more the speakers 216, and so forth. The detachable speaker section 506 may be configured to provide sound 126 when attached to the support section 504 or detached from the support section 502.

In the implementation where the detachable speaker section 506 is able to operate while detached, a wired or wireless connection may be used to provide the audio signal/data 202 to the detached speaker section 506. In one implementation the audio amplifier 214 may be disposed within the support section 502 and may provide an amplified drive signal to the detachable speaker sections 506 by way of a plurality of electrical conductors which remain connected after detachment. For example, a cable may connect the detachable speaker section 506 and the speakers 216 therein with the support section 502.

In other implementations, the detachable speaker section 506 may be inoperative while detached. For example, the user may swap out one detachable speaker section 506 which includes speakers 216 having particular characteristics for another detachable speaker section 506 having speakers 216 with different characteristics.

The support section 502 may include one or more conductors configured to provide electrical power, signal transfer, and so forth. The speaker circuitry 204 may be encapsulated within, or attached to, the support section 502. In some implementations, the support section 502 may include one or more sections as described above which are configured to fold.

In some situations, the user may find it advantageous to place speakers 216 at particular locations. For example, the user may wish to set the media device 102 on a coffee table and watch a movie presented on the display 108 while sitting in a chair. To improve the sound experience, the user may detach the speakers 216 and arrange them on the coffee table such that the emitted sound 126 is directed towards the user.

Figure 6:
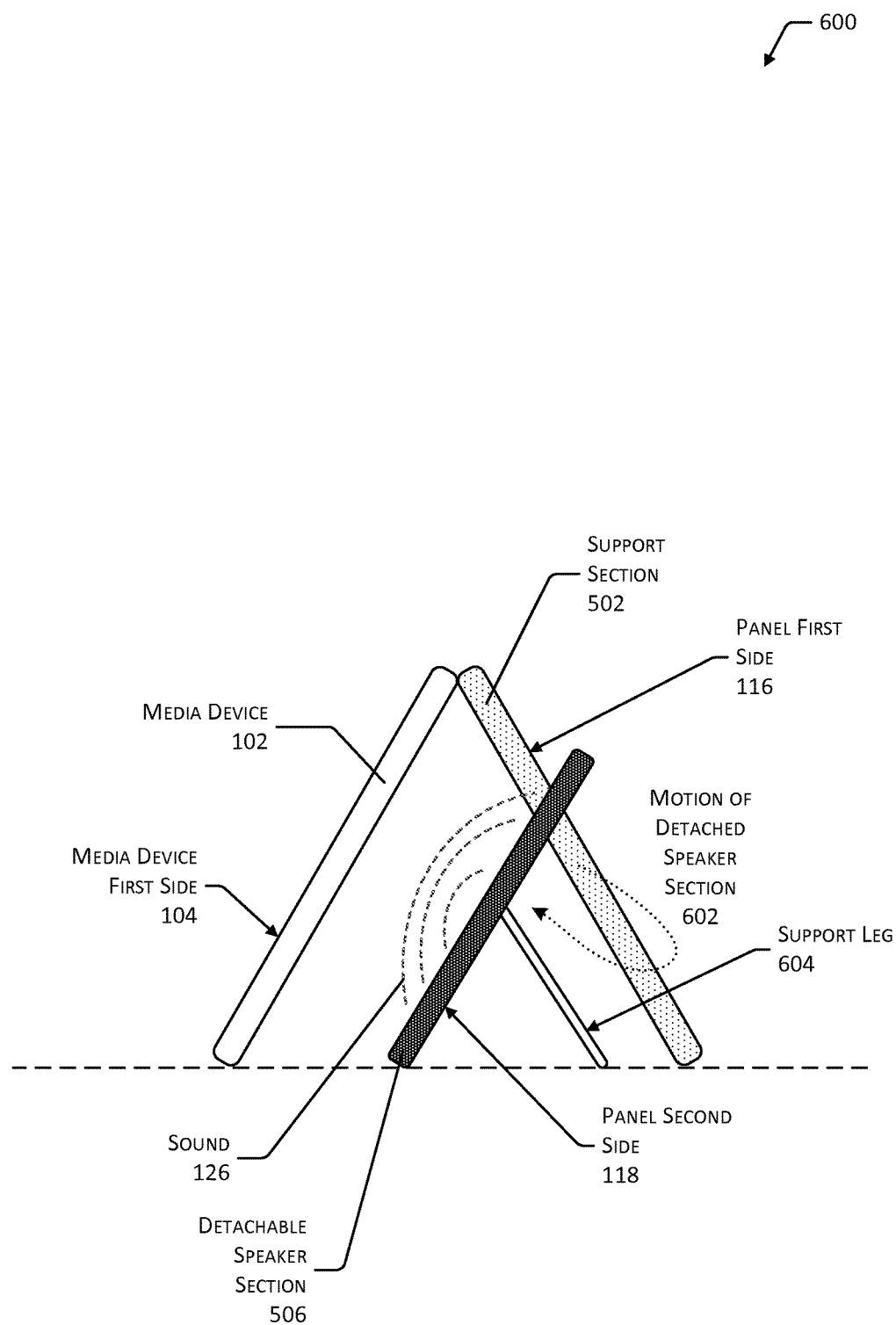
FIG. 6 is a side view of the second implementation of the first audio accessory, in which the detachable speaker sections are placed alongside the media device.

FIG. 6 is a side view 600 of the second implementation of the first audio accessory. In this view, the detachable speaker sections 506 are placed alongside the media device 102, such as on either side of the media device 102 to improve spatialization of the output audio. Illustrated here with a dotted line is motion of the detached speaker section 602 indicating the detachment and arrangement of the detached speaker section 602 to the side of the media device 102. Also shown is a support leg 604 which may extend from the detachable speaker section 506. In some implementations, the support leg 604 may be omitted, or the detachable speaker section 506 may be configured to attach to the media device 102, a portion of the media device retention sleeve 130, and so forth.

As depicted here, the support section 502 may be configured to act as a stand for the media device 102. The support section 502 may comprise one or more sections. In some implementations, as described above the sections may be joined with one or more hinges 120 and may be configured to fold to provide different configurations which may be suitable for use as a stand.

Figure 7:
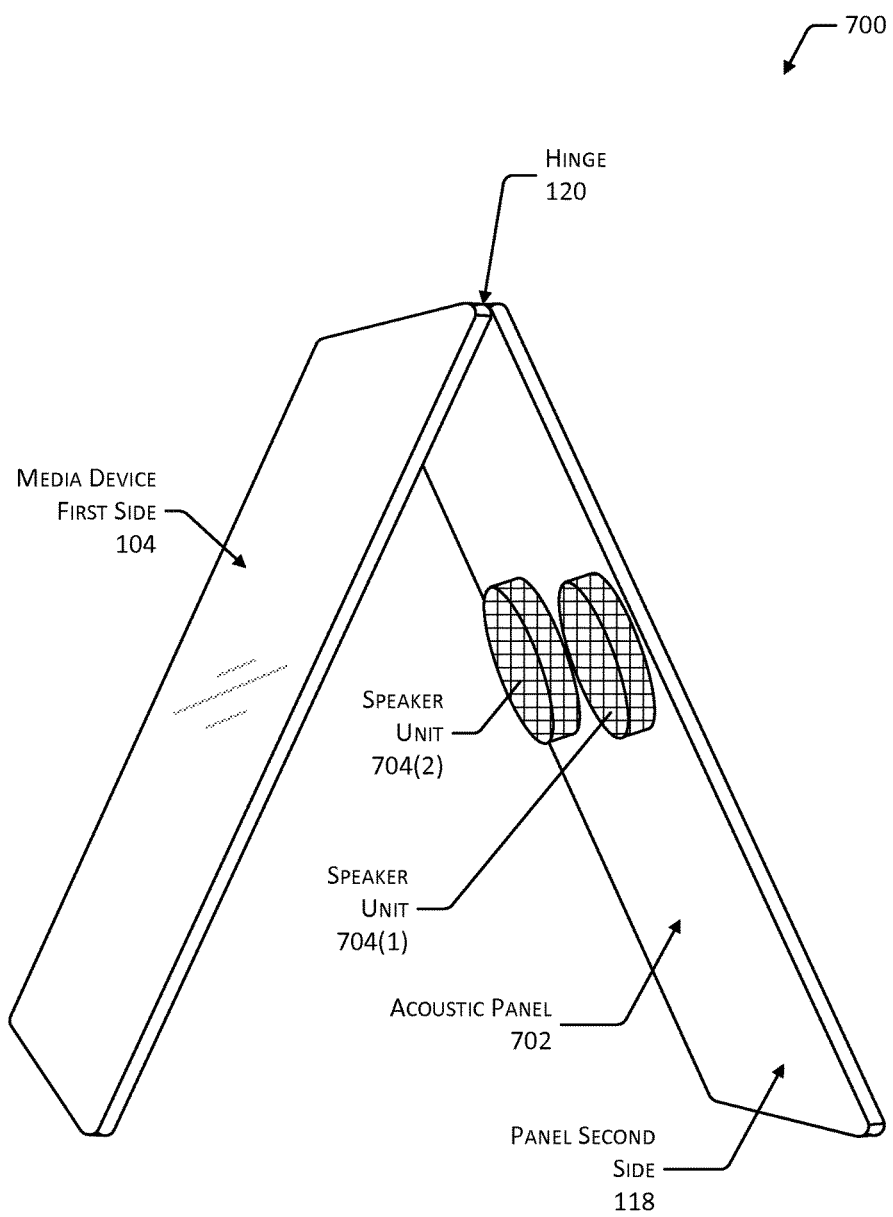
FIG. 7 is a view of a second audio accessory for a media device comprising an acoustic panel which acts as an acoustic radiator for one or more speaker units.

FIG. 7 is a view 700 of a second audio accessory for the media device 102. The second audio accessory comprises an acoustic panel which acts as an acoustic radiator for one or more speaker units which may be attached or detached therefrom.

Similar to the configuration described above with respect to the first audio accessory, the media device 102 may be joined to an acoustic panel 702. The media device 102 and the acoustic panel 702 may be attached by a coupling assembly 408, such as the hinge 120 depicted here. Similar to the speaker panel 114 described above, the acoustic panel 702 may be configurable to act as a cover for at least a portion of the media device first side 104 (or front) of the media device 102. The acoustic panel 702 may remain attached the media device 102 via the coupling assembly 408 while operating as an acoustic radiator.

In some implementations, a hinge sensor 218 may be configured to detect the state of the hinge 120. As described above, in some implementations operation of the accessory may be based at least in part on the state of the hinges 120, such as whether the acoustic panel 702 is deployed or stowed.

The acoustic panel 702 is considered passive in that it is unable to produce sound 126 without a speaker unit 704 attached, such as described below. When attached, the speaker unit 704 may utilize the acoustic panel 702, or a portion thereof, as an acoustic radiator. The user may customize the system by adding or removing speaker units 704 which provide different acoustic characteristics. For example, the user may choose to have a speaker unit 704 comprising a woofer 216(3).

The user may attach one or more of the speaker unit 704 to the acoustic panel 702. The speaker 216, or a component thereof, within the speaker unit 704 may be configured to emit sound 126 during operation which when attached to the acoustic panel 702 drives the acoustic panel 702 as an acoustic radiator.

The speaker unit 704 may include an attachment mechanism configured to allow the speaker unit 704 to be attached and detached from the acoustic panel 702. The attachment mechanism may comprise one or more of a mechanical latch, physical interference fit, strap, suction cup, magnet, and so forth. In one implementation, the attachment mechanism may comprise one or more magnets configured such that the speaker unit 704 is attracted to the acoustic panel 702 or a portion thereof.

The acoustic panel 702 may be configured with one or more attachment points configured to engage the attachment mechanism of the speaker unit 704. These attachment points may include one or more of a mechanical latch, physical interference fit, strap, suction cup, magnet, and so forth. These attachment points may be configured to operate in a complementary fashion with the attachment mechanism of the speaker unit 704. As described below with regard to FIG. 8, in some implementations the attachment points may be provided at predetermined locations to provide particular acoustic conditions.

The acoustic panel 702 may comprise one or more sections, such as described above. For example, the acoustic panel 702 may be configured with a plurality of sections and may be configured to fold to provide a stand for the media device 102.

In some implementations, such as described below, the speaker unit 704 may be configured to couple to an adjacent speaker unit 704. For example, the attachment mechanism may include one or more magnets configured to be magnetically attracted to corresponding magnets or ferrous material within an adjacent speaker unit 704 when stowed. This configuration may facilitate storage of the speaker units 704.

In some implementations, the speaker units 704 may be configured to produce sound 126 when not attached to the acoustic panel 702. For example, the speaker unit 704 may include a diaphragm coupled to voice coil configured to generate the sound 126.

Similar to the description above with regard to the speaker sections 124, the speaker units 704 may be configured with different acoustic characteristics. Given the ease with which a user may attach or detach the speaker units 704, the user may readily customize or adjust the audio output by selecting particular speaker units 704. For example, the user may mix and match speaker units 704 of differing capabilities such that at least a portion of the speaker units 704 comprise one or more of different speaker types. The different speaker types may include a full-range 216(1), subwoofers 216(2), woofers 216(3), mid-range 316(4), tweeters 216(5), or other speakers 216(X). A single speaker unit 704 may include one or more different speaker types.

In some implementations the acoustic panel 702 may include one or more electronic components, such as the speaker circuitry 204, electrical conductors for distributing electricity or signals, and so forth. The acoustic panel 702 is shown in a planar configuration. However in other implementations, the acoustic panel 702 may include one or more curves or other features.

Figure 8:
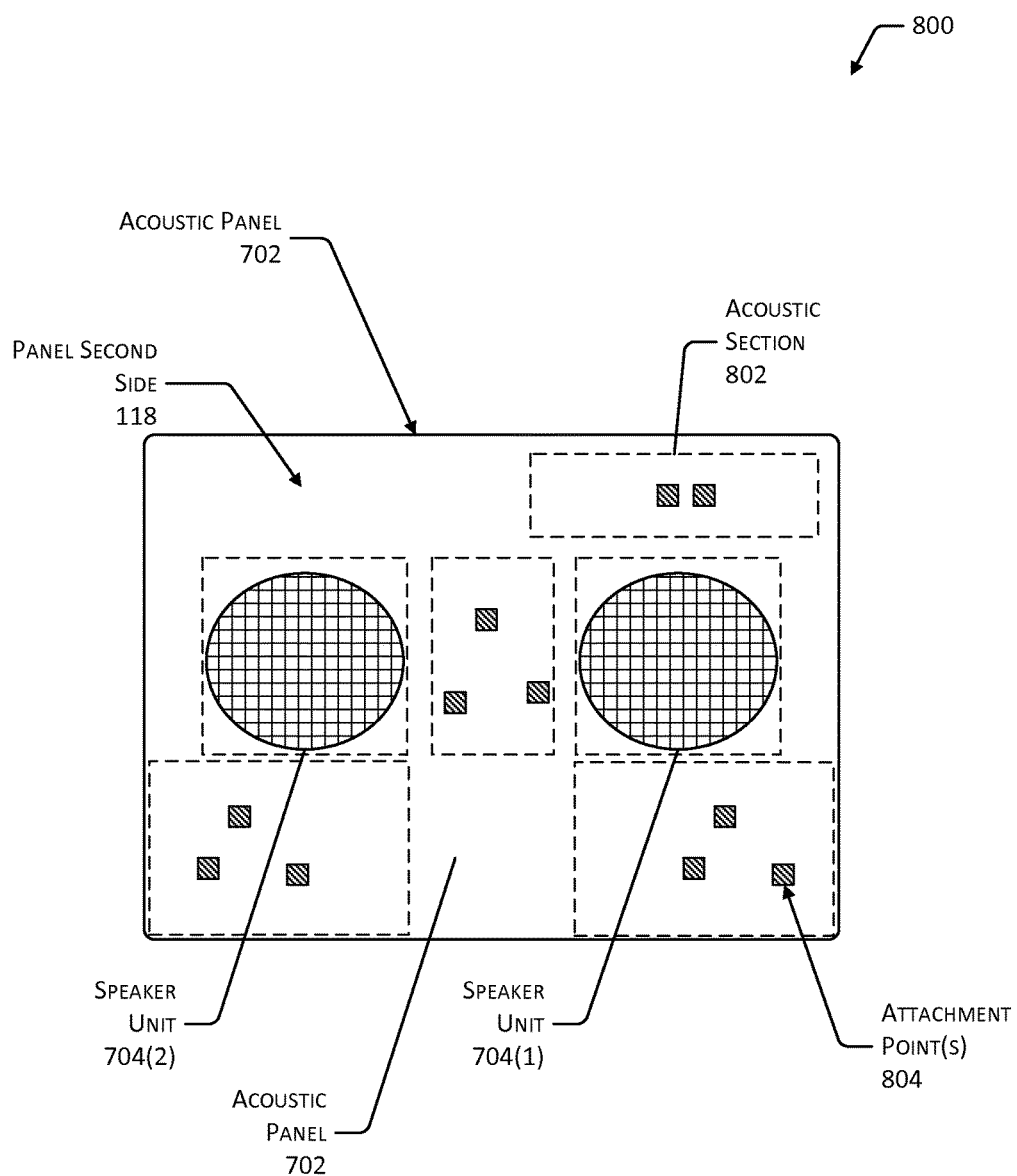
FIG. 8 is a front view of the second audio accessory indicating various attachment points and acoustic sections of the acoustic panel.

FIG. 8 is a front view 800 of the second audio accessory indicating various attachment points and acoustic sections of the acoustic panel 702. In this view 800, the panel second side 118 of the acoustic panel 702 is shown.

As described above, the acoustic panel 702 may include one or more sections. These sections may be rigid. In some implementations, different sections or portions of sections may be configured to provide different acoustic characteristics, forming acoustic sections 802. The acoustic characteristics may be determined by one or more of material composition of the section, stiffness of the section, thickness of the section, and so forth. For example, within the same acoustic panel 702 the material, structure, mass, and so forth of acoustic section 802(1) may differ from that of acoustic section 802(2). The acoustic sections 802 may be configured to provide a particular acoustic response when driven by the speaker unit 704. The speaker unit 704 may be placed proximate to the acoustic section 802(1) to provide a particular acoustic effect. Continuing the example, the acoustic section 802(1) may comprise a particularly rigid material of a size suitable for coupling to a sub-woofer 216(2) to provide a low-frequency sound 126.

In some implementations, the acoustic panel 702, or a portion thereof such as a section may comprise a frame and a diaphragm movably coupled to the frame. The diaphragm may then be configured to couple to at least a portion of an exciter in the speaker unit 704. In this fashion, the speaker unit 704 may drive a diaphragm external to itself.

As described above, the acoustic panel 702 may have one or more attachment points 804 at which speaker units 704 may be attached. These attachment points 804 may be include mechanical latches, physical interference fit features, straps, threaded cavities or features, knobs, magnets, and so forth. In some implementations, the speaker units 704 may be attached to any location on the acoustic panel 702. For example, speaker units 704 may include magnets and the acoustic panel 702 may comprise a ferrous metal. The user may then magnetically attach the speaker unit 704 to any desired location on either side of the acoustic panel 702. In some implementations, a portion of the speaker unit 704, such as an exciter in a speaker 216 may be configured to mechanically couple to one or more attachment points 804. Placement of the speaker units 704 on the acoustic panel 702 may be constrained to predetermined locations. These predetermined locations may be characterized by the presence of one or more attachment points 804. In some implementations, the predetermined locations may correspond to one or more acoustic sections 802. For example, a particular location acoustic section 802 designated by one or more attachment points 804 on the acoustic panel 702 may be determined to be well-suited to accept exciter input for low frequencies, while another acoustic section 802 designated by one or more other attachment points 804 may be better suited for high frequencies.

In some implementations, the predetermined locations may be associated with particular types of speaker units 704. For example, a particular location on the acoustic panel 702 may be predetermined as being particularly suitable for placement of a speaker unit 704 including a subwoofer 216(2). The speaker unit 704 which includes the subwoofer 216(2) may be keyed such that it will attach at the predetermined location and not at another less optimal location. The attachment points 804 may also provide connectivity for electrical power, data transfer, signal transfer, and so forth.

Two speaker units 704(1) and 704(2) are depicted by way of illustration, and not as a limitation. In some implementations no speaker unit 704 may be attached to the acoustic panel 702, or more than two speaker units 704 may be attached to the acoustic panel 702. In some implementations, placement of the speaker units 704 may be constrained to a single side of the acoustic panel 702, or may be provided for on both sides. For example, the attachment points 804 may be arranged only on the panel second side 118 of the acoustic panel 702.

Figure 9:
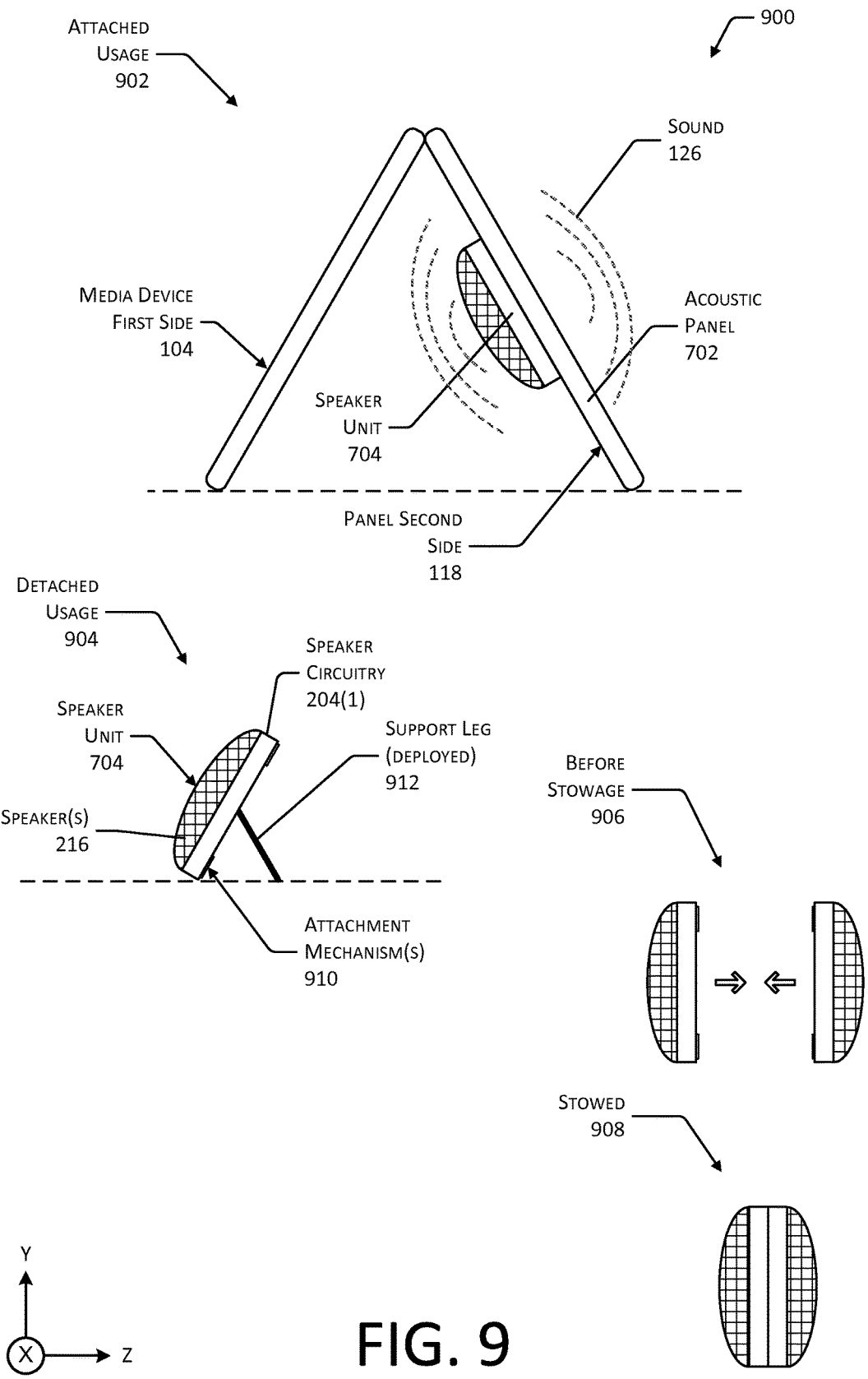
FIG. 9 is a side view of the second audio accessory and the speaker units.

FIG. 9 is a side view 900 of the second audio accessory and the speaker units 704. In this illustration, views include attached usage 902, detached usage 904, before stowage 906, and a stowed arrangement 908.

The attached usage 902 depicts the speaker unit 704 attached to the acoustic panel 702. The speaker unit 704 is active and uses the acoustic panel 702, or a portion thereof, as an acoustic radiator to emit sound 126. In other implementations, the speaker unit 704 may be affixed to other surfaces or objects, and may use those as acoustic radiators. For example, speaker unit 704 may be affixed to a window.

The detached usage 904 illustrates a situation in which the speaker unit 704 may operate to provide sound 126 while detached from the acoustic panel 702. As described above, the speaker unit 704 may include one or more speakers 216, and speaker circuitry 204. For example, the speaker 216 may comprise an exciter coupled to a diaphragm.

In some implementations, the speaker unit 704 may comprise a speaker 216 which omits a diaphragm or similar structure, and may rely on interaction with the acoustic panel 702 to generate the sound 126. For example, the speaker 216 may comprise an exciter configured to move at least a portion of the acoustic panel 702 during operation. The exciter may comprise one or more of a voice coil, piezoelectric device, or electrostatic driver.

In some implementations, the speaker unit 704 may include sufficient speaker circuitry's 204 to operate without physical connection to the acoustic panel 702 or the media device 102. In one implementation the speaker unit 704 may be configured with a wireless communication interface 212(2) and use a battery within the speaker unit 704 to power the speaker circuitry 204 and generate the sound 126. For example, the wireless communication interface 212(2) may be compliant with at least a portion of one or both of the Bluetooth® or the Wi-Fi™ wireless standards.

In another implementation, speaker unit 704 may be tethered to the acoustic panel 702, or the media device 102, and receive one or more of electrical power, audio signal/data 202, and so forth by way of a wired connection.

The speaker unit 704 may also include one or more attachment mechanisms 910. As described above, the attachment mechanism 910 may comprise one or more of a mechanical latch, physical interference fit, strap, suction cup, magnet, and so forth. The attachment mechanism 910 may also include electrical connections, optical connections, or both. For example, the attachment mechanism 910 may comprise one or more pogo pins configured to come into contact with a corresponding pad on the acoustic panel 702. The pad may comprise an electrically conductive material, such as a metal or conductive plastic.

The speaker unit 704 may also include a support leg 912 which is depicted here in a deployed configuration. The support leg 912 may be configured to maintain the speaker unit 704 and a particular orientation. In some implementations, the support leg 912 may be omitted from the speaker unit 704, which may then be configured to attach to, or rest upon, another surface.

Before stowage 906, two speaker units 704 may be brought together. As described above, in some implementations the attachment mechanism 910 of the speaker unit 704 may be configured to couple to another speaker unit 704. In some implementations, the shape of the speaker unit 704 may be configured to allow joining of more than two speaker units 704. For example, the speaker unit 704 may be implemented in a cylindrical form factor, and a plurality of speaker units 704 may be stacked one next to another.

Figure 10:
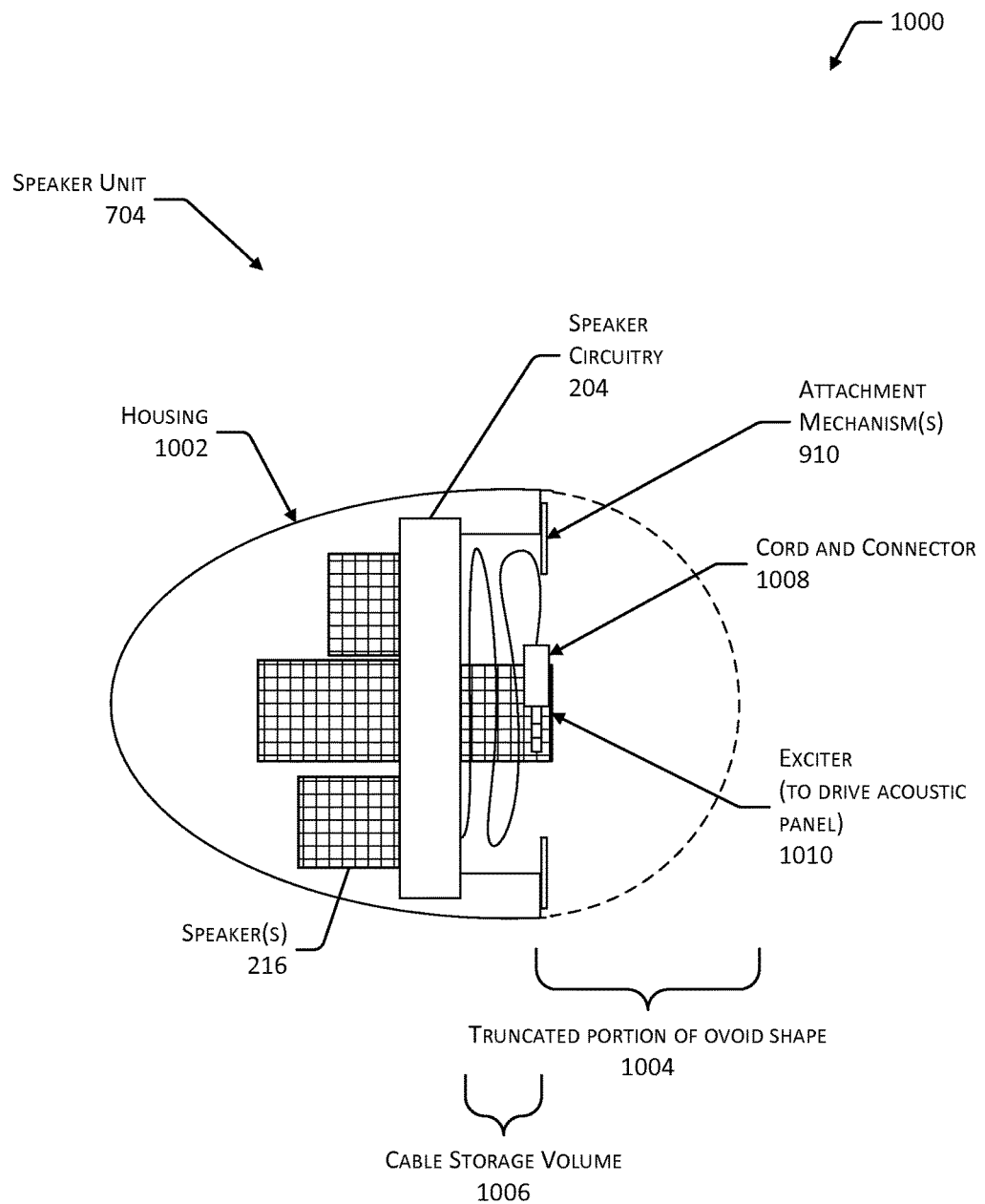
FIG. 10 is a side view of another implementation of the speaker units for the second audio accessory.

FIG. 10 is a cross-sectional side view 1000 of another implementation of the speaker unit 704 for the second audio accessory. As shown here, a housing 1002 of the speaker unit 704 has an ovoid shape which is truncated at one end. The ovoid, or "egg", shape may have a first end with first radius of curvature and a second end with a second radius of curvature greater than the first radius of curvature. As illustrated here, the ovoid shape is truncated, with the truncated portion of the ovoid shape 1004 indicated here with a dotted line.

The housing 1002 may be configured to provide particular acoustic characteristics. For example the housing 1002 may be configured to provide resonance at one or more particular frequencies. The housing 1002 may include one or more perforations or holes to facilitate the transmission of sound 126. Depicted within the speaker unit 704 is speaker circuitry 204, a plurality of speakers 216, and the attachment mechanisms 910. In some implementations, one or more of the speakers 216 may be configured to couple to the housing 1002 or a portion thereof. For example, the housing 1002 may be used as a diaphragm by the speaker 216.

As described above, in some implementations the speaker unit 704 may use a physical conductor to couple to the acoustic panel 702, or the media device 102. In this illustration, a cable storage volume 1006 is depicted within the housing 1002. Stowed within the cable storage volume 1006 is a cord and connector 1008. For example, when using the speaker unit 704 in the detached usage 904, the user may plug the cord and connector 1008 into a corresponding jack on the acoustic panel 702. When not in use, the according connector 1008 may be neatly stowed within the cable storage volume 1006. As described above, at least two speaker units 704 may be attached together into the stowed configuration 908.

Also illustrated here is an exciter 1010. The exciter 1010 is configured to move at least a portion of the acoustic panel 702 during operation. The exciter 1010 may comprise one or more of: a voice coil, piezoelectric device, or electrostatic driver, and so forth. The exciter 1010 may be configured to couple mechanically, magnetically, or acoustically, to the acoustic panel 702. For example, the exciter 1010 may come into physical contact with a portion of the acoustic panel 702. In some implementations, the exciter 1010 may be configured to mechanically engage a feature of the acoustic panel 702. For example, the acoustic panel 702 attachment points 804 comprising a latch feature, knob, threaded cavity, and so forth, to which the exciter 1010 may be affixed.

Figure 11:
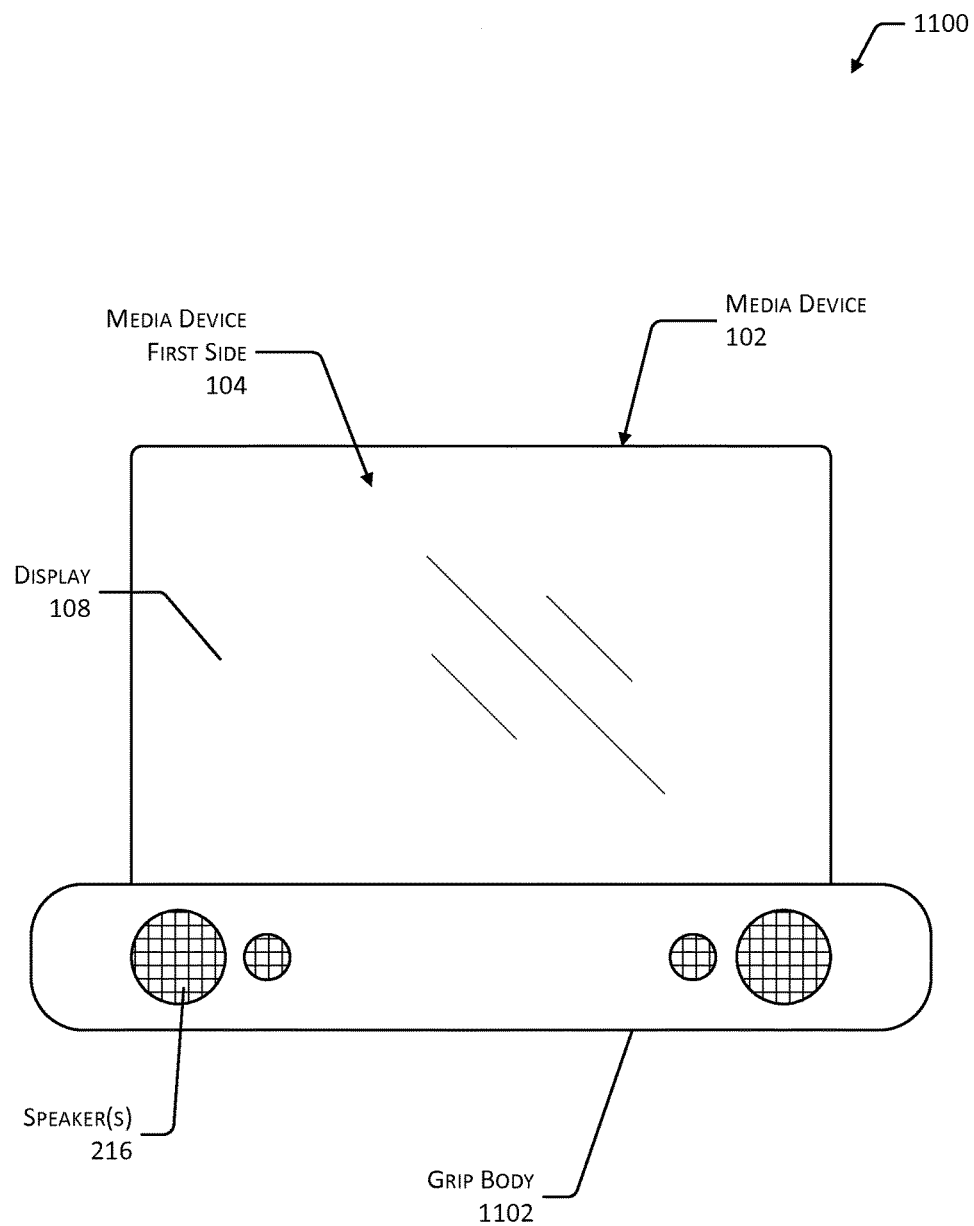
FIG. 11 is a front view of a third audio accessory for a media device which includes speakers and a grip body which is affixed to a media device.
Figure 11:
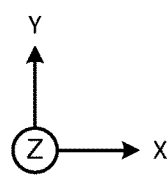

FIG. 11 is a front view 1100 of a third audio accessory for use with the media device 104. The third audio accessory includes a grip body 1102. The grip body 1102 may be configured to provide an ergonomic shape which is compatible with a grip by a human hand. This shape may improve the overall user experience while using the device by reducing hand fatigue associated with holding the media device 102

The grip body 1102 may also be configured to support the media device 102 as a stand when resting on a surface. For example, the grip body 1102 may include a flat portion suitable for resting on a flat surface, or may include one or more support features such as a support member which extends from the grip body 1102.

The grip body 1102 houses one or more speakers 216, and may also house at least a portion of the speaker circuitry 204. The speakers 216 may be configured to direct the sound 126 to the general position in space in which the user's head is expected to be during typical use. In some implementations, the grip body 1102 may house other devices, such as buttons, touch sensors, fingerprint scanners, cameras, and so forth.

The grip body 1102 is configured to be affixed to at least a portion of the media device 102. For example, as illustrated here the grip body 1102 may be coupled to a lower edge of the media device 102.

Figure 12:
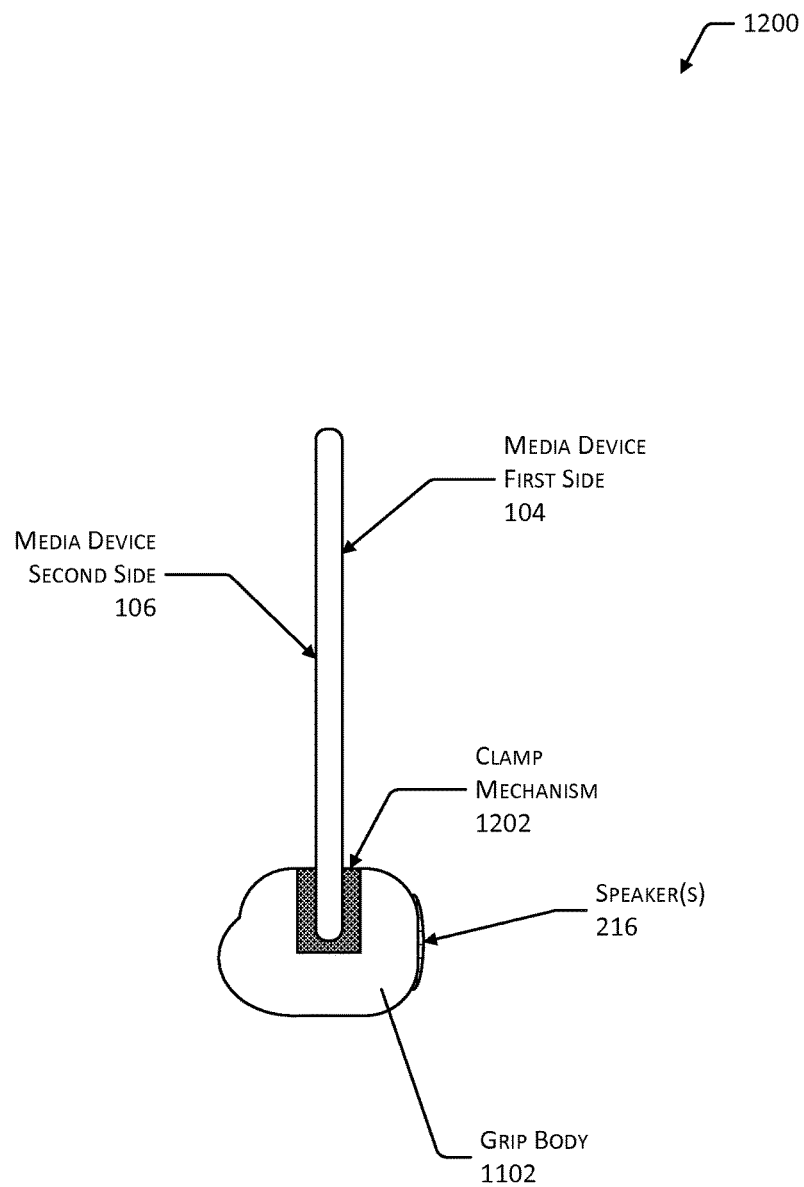
FIG. 12 is a side view of the third audio accessory.
Figure 12:
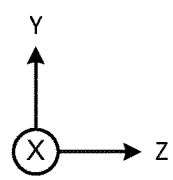

FIG. 12 is a side view 1200 of the third audio accessory. In this illustration, a clamp mechanism 1202 is depicted. The clamp mechanism 1202 may include one or more moving pieces configured to apply a mechanical pressure to the media device 102, such mechanical pressure configured to maintain a hold on the media device 102.

In another implementation, the clamp mechanism 1202 may include no moving parts, such as a V-shaped wedge within which an elastomeric material is disposed. In these implementations, the user may push a portion of the media device 102 into the wedge and the resiliency of the elastomeric material may maintain the mechanical pressure.

In yet another implementation, mechanical latches, mechanical interference fit features, and so forth may be used to attach the grip body 1102 to the media device 102. Regardless of the mechanism, the user may be able to attach or detach the grip body 1102 from the media device 102 as desired.

By using the various audio accessories described in this disclosure, the overall user experience while consuming content on the media device 102 may be improved. The various audio accessories described herein may be used in various combinations. For example the speaker panel 114 may be configured with one or more portions configured to act as acoustic panels 702. In this way, the speaker panel 114 may be configured to accept one or more of the speaker units 704 in addition to the speaker sections 124. In another example, the grip body 1102 may be configured to provide audio data to the speaker units 704 operating in the detached usage mode 904 as separate from the acoustic panel 702.

Those having ordinary skill in the art will readily recognize that certain steps or operations illustrated in the figures above can be eliminated or taken in an alternate order. Moreover, the methods described above may be implemented as one or more software programs for a computer system and are encoded in a computer-readable storage medium as instructions executable on one or more processors.

Additionally, those having ordinary skill in the art readily recognize that the devices and systems described above can be utilized in a variety of configurations, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. An apparatus, comprising:
   an acoustic panel comprising a rigid material configured to act as a cover for at least a portion of a front of a media device, the acoustic panel comprising two or more sections having attachment points at predetermined locations on the acoustic panel, the two or more sections having the attachment points at predetermined locations being configured to produce particular acoustic outputs; and
   a speaker unit comprising:
   magnetic attachment mechanisms provided at the one or more attachment points;
   a communication interface configured to receive an audio signal from the media device;
   a first speaker having a first exciter and a second speaker having a second exciter, the first and second speaker configured to emit sound during operation and use the two or more sections of the acoustic panel as an acoustic radiator, wherein the predetermined locations comprise a first predetermined location on a first section of the acoustic panel and a second predetermined location on a second section of the acoustic panel;
   the first speaker being magnetically coupled, using a first of the magnetic attachment mechanisms, to a first attachment point keyed to the first speaker at the first predetermined location on the first section of the acoustic panel, the first section of the acoustic panel comprising a first material having first acoustic characteristics responsive to the first speaker providing first frequency vibrations from the first exciter;
   the second speaker being magnetically coupled, using a second of the magnetic attachment mechanisms, to a second attachment point keyed to the second speaker at the second predetermined location on the second section of the acoustic panel, the second section of the acoustic panel comprising a second material having second acoustic characteristics responsive to the second speaker providing second frequency vibrations from the second exciter;

an audio amplifier configured to amplify the audio signal and operate one of the first and the second speaker; and a power supply comprising one or more batteries configured to provide electrical power to at least the communication interface and the audio amplifier.

2. The apparatus of claim 1, wherein the first and the second of the magnetic attachment mechanisms comprise one or more magnets configured such that the first speaker is magnetically attracted to the second speaker when stowed.

3. The apparatus of claim 1, wherein the acoustic panel is configured to act as a cover for at least a portion of an external device.

4. The apparatus of claim 1, further comprising:

a coupling assembly configured to couple the acoustic panel to the media device by way of at least one hinge; and wherein the acoustic panel remains coupled to the media device via the coupling assembly while operating as an acoustic radiator.

5. A system comprising:

an acoustic panel including a first section having a first attachment point at a first predetermined location and a second section having a second attachment point at a second predetermined location, the first section comprising a first material having a first acoustic characteristic to produce a first frequency response and the second section comprising a second material having a second acoustic characteristic to produce a second frequency response; and a speaker unit comprising:

a first speaker having a first exciter and a second speaker having a second exciter, the first and second speaker configured to drive the first and second sections respectively of the acoustic panel to emit sound during operation of the first and the second speaker;

a communication interface configured to receive an audio signal from an external device; and a first magnetic attachment mechanism provided at the first attachment point at the first predetermined location on the first section of the acoustic panel and a second magnetic attachment mechanism provided at the second attachment point at the second predetermined location on the second section of the acoustic panel, wherein:

the first speaker is magnetically coupled, using the first magnetic attachment mechanism, to the first attachment point keyed to the first speaker at the first predetermined location on the first section of the acoustic panel to provide a first frequency sound in response to first frequency vibrations from the first exciter of the first speaker; and the second speaker is magnetically coupled, using the second magnetic attachment mechanism, to the second attachment point keyed to the second speaker at the second predetermined location on the second section of the acoustic panel to provide a second frequency sound in response to second frequency vibrations from the second exciter of the second speaker.

6. The system of claim 5, wherein the first and the second magnetic attachment mechanisms are further configured to allow the first and the second speaker of the speaker unit to be attached to and detached from one or more other speaker units.

7. The system of claim 5, wherein the acoustic panel is configured to act as a cover for at least a portion of the external device.

8. The system of claim 5, wherein the acoustic panel is configured to form a stand for the external device.

9. The system of claim 5, the acoustic panel further comprising:

the first and the second attachment points configured to couple to the first and the second magnetic attachment mechanisms of the speaker unit, wherein:

the first and the second attachment points are configured to accept the speaker unit having a particular type of the first and the second speaker.

10. The system of claim 5, the speaker unit further comprising:

an audio amplifier configured to amplify the audio signal and operate one of the first and the second speaker; and a power supply comprising one or more batteries configured to provide electrical power to the audio amplifier.

11. The system of claim 5, wherein:

the communication interface is compliant with at least a portion of a BLUETOOTH® wireless standard.

12. The system of claim 5, wherein the first and the second magnetic attachment mechanisms comprise one or more magnets.

13. An apparatus comprising:

an acoustic panel including a first section of a first material and having a first attachment point at a first predetermined location and a second section of a second material and having a second attachment point at a second predetermined location, the first section having a first acoustic characteristic to produce a first frequency response and the second section having a second acoustic characteristic to produce a second frequency response; and a speaker unit comprising:

a housing;

a first speaker having a first exciter and a second speaker having a second exciter, the first and second speaker configured to drive the first and second sections respectively of the acoustic panel to emit sound;

a first magnetic attachment mechanism provided at the first attachment point at the first predetermined location on the first section of the acoustic panel;

a second magnetic attachment mechanism provided at the second attachment point at the second predetermined location on the second section of the acoustic panel;

a communication interface configured to receive an audio signal from an external device;

an audio amplifier configured to amplify the audio signal and operate the speaker unit; and a power supply comprising one or more batteries configured to provide electrical power to the communication interface and the audio amplifier;

wherein:

the first speaker is magnetically coupled, using the first magnetic attachment mechanism, to the first attachment point keyed to the first speaker at the first predetermined location on the first section of the acoustic panel to provide a first frequency sound in response to first frequency vibrations from the first exciter of the first speaker; and the second speaker is magnetically coupled, using the second magnetic attachment mechanism, to the second attachment point keyed to the second speaker at the second predetermined location on the second section of the acoustic panel to provide a second frequency sound in response to second frequency vibrations from the second exciter of the second speaker.

14. The apparatus of claim 13, wherein the housing comprises an ovoid shape having a first end with a first radius of curvature and a second end with a second radius of curvature greater than the first radius of curvature, the ovoid shape truncated at the second end; and wherein the first magnetic attachment mechanism is arranged at the second end and further configured to join the first speaker to another speaker.

15. The apparatus of claim 13, the first and the second exciter comprising one or more of: a voice coil, piezoelectric device, or electrostatic driver.

16. The apparatus of claim 15, wherein the acoustic panel comprises:
a frame; and
a diaphragm moveably coupled to the frame and to at least a portion of the first and the second exciter.

17. The apparatus of claim 13, wherein the acoustic panel is configured to act as a cover for at least a portion of the external device.

18. The apparatus of claim 13, wherein the first acoustic characteristic is determined by one or more of:

material composition of the first section,
stiffness of the first section, or
thickness of the first section; and
wherein the second acoustic characteristic is determined by one or more of:
material composition of the second section,
stiffness of the second section, or
thickness of the second section.

19. The apparatus of claim 13, wherein the first and the second attachment points are configured to accept the speaker unit having a particular type of first and second speaker.

20. The apparatus of claim 13, wherein the acoustic panel further comprises:

a rigid upper section coupled to the external device by way of a first hinge, wherein the first section is coupled to the rigid upper section by way of a second hinge and the second section is coupled to the rigid upper section by way of a third hinge;

a rigid first center section coupled to the first section by way of a fourth hinge and also coupled to a rigid second center section by way of a fifth hinge; and the rigid second center section coupled to the second section by way of a sixth hinge; and wherein the acoustic panel is configurable to maintain:
a stowed position in which the acoustic panel covers at least a portion of one or more of a front or a back of the external device; and
a deployed position in which the acoustic panel extends away from the external device to form a stand.

\* \* \* \* \*